US007653527B2

(12) United States Patent
Guenther et al.

(10) Patent No.: US 7,653,527 B2
(45) Date of Patent: Jan. 26, 2010

(54) RUNTIME SELECTION OF CODE VARIANTS IN A MULTIPROGRAM COMPUTER HARDWARE EMULATION SYSTEM

(75) Inventors: Russell W. Guenther, Glendale, AZ (US); Clinton B. Eckard, McMinnville, TN (US); David W. Selway, Phoenix, AZ (US)

(73) Assignee: Bull HN

( * ) Notice: Subject to any disclaimer, the term of this patent is extended or adjusted under 35 U.S.C. 154(b) by 661 days.

(21) Appl. No.: 11/323,843

(22) Filed: Dec. 29, 2005

(65) Prior Publication Data
US 2007/0156385 A1    Jul. 5, 2007

(51) Int. Cl.
G06F 9/455 (2006.01)
(52) U.S. Cl. .......................................... 703/24; 703/26
(58) Field of Classification Search .................... 703/24; 717/138
See application file for complete search history.

(56) References Cited

U.S. PATENT DOCUMENTS 5,966,515 A * 10/1999 Alferness ...................... 703/21
6,901,583 B1 * 5/2005 Park ............................. 717/134
7,096,322 B1 * 8/2006 Sollom et al. ................ 711/143
7,222,064 B1 * 5/2007 Sollom et al. ................. 703/26
7,490,031 B1 * 2/2009 Qiu .............................. 703/22

OTHER PUBLICATIONS

Silberschatz et al. 2002, John Wiley & Son, Inc., "Operating system Concepts, Sixth edition", p. 95-106.*

* cited by examiner

Primary Examiner—Paul L Rodriguez
Assistant Examiner—Eunhee Kim
(74) Attorney, Agent, or Firm—Russell W. Guenthner

(57) ABSTRACT

As fast and powerful commodity processors have been developed, it has become practical to emulate the proprietary hardware systems of powerful older computers on platforms built using commodity processors. The systems being emulated are often large mainframe computers with large numbers of disks, communications systems and other attached hardware. Because of the size and expense, and also because databases involved must reside in only one location, it is difficult to replicate these systems for testing, development, debug or for providing alternative options to customers. A method for providing a single emulated computer system which provides for multiple views or options in control of the emulator is disclosed in which the options are dependent and selected based on job or user basis. The mechanism continues to provide for high performance and a single copy of the operating system with multiple processes, jobs and threads being emulated under user controlled parameters.

13 Claims, 9 Drawing Sheets

600 EMULATION SOFTWARE OPTIONS

601 A) EMULATION SOFTWARE IN "C" OR ASSEMBLY (C/A)
602 B) DEBUG (TRACE) OUTPUT REQUIRED OR NOT (D/N)
603 C) SELECTION OF REVISION LEVEL (0,1,...N)

SELECTION OF OPTIONS DETERMINES SOFTWARE SET.

EXAMPLES:

630 CD0 = "C" SOURCE CODE WITH DEBUG, REV. 0
631 AN0 = ASSEMBLY SOURCE WITH DEBUG, REV. 0
632 AN2 = ASSEMBLY SOURCE WITH DEBUG, REV. 2

|  |  | 602 |  | 603 |  |  |
|---|---|---|---|---|---|---|
|  |  | 0 | 1 |  | N |  |
|  |  |  |  | SELECTED OPTION |  |  |
| "C" SOURCE CODE | OFF | CD0 | CD1 | ........ | CDN |  |
|  | ON | CN0 | CN1 | ........ | CNN |  |
| ASSEMBLY SOURCE CODE | OFF | AD0 | AD1 | ........ | ADN |  |
|  | ON | AN0 | AN1 | ........ | ANN |  |

RUNTIME SELECTION OF CODE VARIANTS IN A MULTIPROGRAM COMPUTER HARDWARE EMULATION SYSTEM

FIELD OF THE INVENTION

This invention relates to the art of computer system emulation and, more particularly, to a host computer system in which the instruction set of legacy system hardware design is emulated by a software program to thus preserve legacy software. More particularly, this invention relates to debug and maintenance of multiple revisions of emulation software and also to selection between versions implemented in a high level language such as C or C++ and machine level assembly code. Software maintenance, revision control and software debug are enhanced by application of the invention.

BACKGROUND OF THE INVENTION

Users of obsolete mainframe computers running a proprietary operating system may have a very large investment in proprietary application software and, further, may be comfortable with using the application software because it has been developed and improved over a period of years, even decades, to achieve a very high degree of reliability and efficiency.

As manufacturers of very fast and powerful "commodity" processors continue to improve the capabilities of their products, it has become practical to emulate the proprietary hardware and operating systems of powerful older computers on platforms built using commodity processors such that the manufacturers of the older computers can provide new systems which allow their customers to continue to use their highly-regarded proprietary software on state-of-the-art new computer systems by emulating the older computer in software that runs on the new systems.

Accordingly, computer system manufacturers are developing such emulator systems for the users of their older systems, and the emulation process used by a given system manufacturer is itself subject to ongoing refinement and increases in efficiency and reliability.

Some historic computer systems now being emulated by software running on commodity processors have achieved performance which approximates or may even exceed that provided by legacy hardware system designs. An example of such hardware emulation is the Bull HN Information Systems (descended from General Electric Computer Department and Honeywell Information Systems) DPS 9000 system which is being emulated by a software package running on a Bull NovaScale system which is based upon an Intel Itanium 2 Central Processor Unit (CPU). The 64-bit Itanium processor is used to emulate the Bull DPS 9000 36-bit memory space and the GCOS 8 instruction set of the DPS 9000. Within the memory space of the emulator, the 36-bit word of the "target" DPS 9000 is stored right justified in the least significant 36 bits of the "host" (Itanium) 64-bit word. The upper 28 bits of the 64-bit word are typically zero for "legacy" code. Sometimes, certain specific bits in the upper 28 bits of the containing word are used as flags or for other temporary purposes, but in normal operation these bits are usually zero and in any case are always viewed by older programs in the "emulated" view of the world as being non-existent. That is, only the emulation program itself uses these bits.

In the development of the emulator system, careful attention is typically devoted to ensuring exact duplication of the legacy hardware behavior so that legacy application programs will run without change and even without recompilation. Exact duplication of legacy operation is highly desirable to accordingly achieve exactly equivalent results during execution.

In order to achieve performance in an emulated system that at least approximates that achieved by the legacy system hardware, or in more general terms, in order to maximize overall performance, it is necessary that the code that performs the emulation be very carefully designed and very "tightly" coded in order to minimize breaks and maximize performance. These considerations require careful attention to the lowest level design details of the host system hardware, that is, the hardware running the software that performs the emulation. It also requires employing as much parallelization of operations as possible.

An Intel Itanium series 64-bit CPU is an excellent exemplary platform for building a software emulator of a legacy instruction set because it offers hardware resources that enable a high degree of potential parallelism in the hardware pipeline of the Itanium CPU. The Itanium CPU also provides instructions that allow for fast decision making and guidance by the software as to the most likely path of program flow for a reduction in instruction fetch breaks and overall improved performance. In particular, the Itanium architecture provides instructions that allow preloading of a "branch register" which informs the hardware of the likely new path of the instructions to be executed, with the "branch" instruction itself actually happening later. This minimizes the CPU pipeline breaks that are characteristically caused by branch instructions, and allows for typically well predicted branch instructions to be processed efficiently without CPU pipeline breaks wasting cycles. The branch look-ahead hardware of the Itanium CPU, and in particular a specific mechanism for loading and then using a branch register, allows for the emulation software to achieve a higher degree of overlap and, as a result, higher performance in emulated legacy system instruction processing.

Reference may be taken to co-pending U.S. application Ser. No. 11/174,866 entitled "Lookahead Instruction Fetch Process for Improved Emulated Instruction Performance" by Russell W. Guenthner et al, filed Jun. 6, 2005, and assigned to the same Assignee as the present application for a more complete exposition of the advantages of selecting a host processor having the characteristics of the Intel Itanium series processors for emulating legacy software.

The development of software which provides for emulation of the legacy software instruction set on the host machine is complicated, and the requirements on performance are extreme. An approach which allows for ease of development and also provides the ultimate performance is to develop the code first in a high-level language, and then once the functionality and approach are precisely defined, to develop analogous code in assembly language. On the Itanium platform, writing a program in assembly language to achieve the highest level of performance is extremely complex and requires tremendous attention to detail. Accordingly the assembly code is prone to mistakes and subtle problems which are difficult to debug. It is thus advantageous during both the development, and during initial deployment of the emulation software to customers to provide a set of emulation software which is implemented in a high-level language such as C with such a version achieving a high level of reliability. It is also a requirement in order to achieve high performance that a version written in machine assembly language be provided. It may also be a requirement that different versions of the emulation machine be provided as the software is updated, debugged or enhanced. It may also be a requirement that different versions of the software emulation code provide different features to the customer which may be separately priced.

Providing multiple versions of a software emulator for a hardware system is not easily achieved. The supporting memory and I/O system requirements are large and expensive, and it may also not be possible to replicate an entire computer system for ease of testing simply because of the cost involved.

Performance requirements also place a restriction on the methodology for providing optional features or versions of the software. In a very tightly coded burst of assembly language there quite possibly will be no time or space for any sort of programmatic check for feature or version control. As an example, a tightly coded burst of code for emulating a specific emulated machine instruction may take as little as 9 cycles on the Itanium 2 Central Processor Unit, and in those nine cycles there are no slots or instructions available for checking for debug display options, or version control.

BRIEF SUMMARY OF THE INVENTION

Accordingly it would be an advantage to provide for a solution and methodology for computer system hardware emulation that allows for multiple customer options, debug support, and multiple versions and revisions of the emulation software running on a single host system platform, and that also continues to provide for performance that is equivalent to that achievable as though only one option or version of the program was in place.

It would be a further advantage to allow selection of the versions or revision of the software to be run, not at system start-up, but at run-time. That is, it would be a large advantage to have control of jobs which are running on an emulated hardware system such that the user or programmer could select at run-time, or job activity time the version of the software emulator to be utilized. This would allow the large investment in system hardware and software resources to be utilized while examining, using or testing several versions of the emulation software.

When the emulated system is a large mainframe handling multiple programs simultaneously and continuously, this selection and subsequent control of the emulator is not trivial. Software emulation of a hardware system requires that the software emulation appear to act like hardware in that it switches between and performs many tasks for many users or programs simultaneously. The same software emulation system which is utilized to run a user's job, is also simultaneously used to emulate the processing of instructions for both the operating system and the I/O system. In a large system with multiple users, the same emulation software is used to process jobs from many users, threads, or processes. The software emulation of the "hardware" switches rapidly between the tasks to be done, and as a result spends small slices of time processing many users jobs, threads, or processes. Therefore, although the selection of the version can be done at user job startup time, the actual switching between versions of the software must be done much more frequently and at a lower level with the switch potentially happening each and every time the operating system switches between jobs, threads or processes. The selection is visible to the user or programmer, but the switching between the selected versions or options of the emulation software must be provided in a manner invisible to the user or system programmer. It is to these ends that the present invention is directed.

Achieving high performance in a software emulation of a hardware Central Processor Unit and associated computer system requires an implementation that emulates many of the pieces of the original hardware implementation. That is, the software emulation must provide for legacy machine instruction fetching, instruction decode, operand fetch, and instruction execution. Facilities may also be provided for emulation of the associative memory, paging, segmentation and other such support normally provided by a large system mainframe Central Processor Unit. The emulation software is typically implemented in a manner similar to that of most software programs with a higher level main program which invokes and controls the calling of subroutines that do most of the actual work. It is in the manner of calling the subroutines that the subject invention is applied such that the selection of the versions and options is done by the calling mechanism rather than by any actual code to check and branch based upon the user's requirements. It is also a feature of the invention that the selection is done without any additional overhead in the calling process.

Emulation software is typically implemented as a series of calls to subroutines and returns from subroutines, and often written in or at least utilizing a high-level language such as "C". The machine level instructions which are the output from a C compiler and executed on the host system may provide direct hardware support for the C call and return mechanism. It is also possible in both C and assembly language programming to directly branch from one are of the program to another with conditional branches, or branches in which the target address of the branch can be modified. These mechanisms provide for fast switching from one section of a program to another. In "C" the target address of a branch is typically stored as a "pointer" value, where a "pointer" is a hardware supported format for storing data in a C variable that "points" to a specific program or data location. The pointer construct in "C" can be used to point to the starting address for subroutines, or to simply a program location within the current program, typically represented in "C" as a "statement label". Control of the program flow can be achieved by utilizing a pointer to specify the address of a subroutine, or statement label, and then modifying the pointer in order to change the program flow from one desired flow to another. That is, the program can branch or call from one portion of the program to another utilizing a pointer value, and if that pointer value is changed by another section of the program, or even by another program, the program flow will be changed.

In a software emulation program the lowest level of software is that which actually implements the execution of the legacy instruction set. Each legacy instruction has an assigned opcode, and one of the key decisions in emulation is determining the mechanism for extracting the opcode field from the emulated instruction, and then branching to the proper program location to process that instruction as specified by the opcode. In order to achieve highest performance, this prefetching (extraction) and instruction decode may be overlapped with other instruction's execution code.

At the next highest level there is program code which invokes the instruction execution code. Other levels of software can exist either above or below these levels.

At each of these levels of software, if there are pointers utilized to specify the host system machine address of the machine code to perform the required processing, then by modifying these pointers the program flow of the emulation software can be controlled.

It can thus be seen that utilizing pointers to control the program flow would allow the flow to be modified without any detriment to performance, and that modifying these pointers that determine the program flow of the emulation software would allow for the program flow to be changed based upon user preferences.

Another requirement is to provide a mechanism to determine when the above mentioned pointers for program flow should be changed, and secondly, to determine the precise mechanism for changing them. The switching of program flow pointers based on the job being processed provides to the user precise control of the environment in which his job runs, while providing other versions or options for emulation of other jobs, processes or threads being processed by the emulation system at approximately the same time. This allows one large emulation system to be used simultaneously for many levels of debug, development and levels of performance without requiring duplication of the rest of the resources of the system.

Utilization of pointers and more specifically the use of pointers to locate function subroutines or branch targets is a subject well known in the computer industry. All modern versions of "C" and "C++" programming languages provide for the storage and use of pointers for function calls and some implementations of "C" provide for branching to a target address stored in a pointer variable. When a higher level language does not provide these constructs they can usually be accomplished in assembly (machine) language.

In the Intel Itanium 2 processor which is the environment for the implementation of the exemplary machine for this invention the assembly language for the machine provides access to hardware registers called "branch" register which when loaded with a pointer value allows for direct branching of the machine to the address referenced by the pointer value. This allows pointers to be loaded from a pool of potential pointers based upon version or option control, and then the flow of the emulation program can be affected when that pointer is used. The branch prediction mechanism of the Itanium 2 Central Processor Unit architecture allows this flow to be accomplished with minimal or no detriment to performance.

The pointers used by the emulator during the emulation can be controlled either by instructions emulated by the emulator itself, or from an outside thread or process. The operating system itself can invoke emulated instruction to change the flow, or specific emulated instructions used during dispatching or job startup can include a check of the options or versions required by the job and set the proper pointers.

The precise timing of when the options and version selection is required is dependent upon the operating system, but in general it must be accomplished at the beginning or end of every slice of time that is devoted by the emulator to any specific single job or program. That is, the process must at least check sometime between any two time slices which might be devoted to different user's jobs or requirements in order to ensure each time slice has the program flow control pointers set as required for that slice of time utilizing the emulation system resources.

Performance of the emulation system software while utilizing pointer based program flow control is an important consideration. Since highest performance is typically a critical consideration in emulation system design, the pointer based flow control must be used in a manner with minimal or no impact on performance. If the emulation system is written in assembly language, the use of branch registers in the exemplary Itanium 2 central processor can provide this minimal impact on performance because of the hardware branch prediction provided by the Itanium 2. If the emulation system program is written in a higher level language such as C, the C mechanisms which provide for calling of a subroutine based upon a pointer can be used, or if the implementation of C being used provides, this can be done with a computed "goto" or branch with the target of the branch being based upon a pointer variable.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 6 is a diagram illustrating multiple versions of the compiled C or assembly emulation processing unit which are dependent upon potential option selection;

DESCRIPTION OF THE PREFERRED EMBODIMENT(S)

Figure 1:
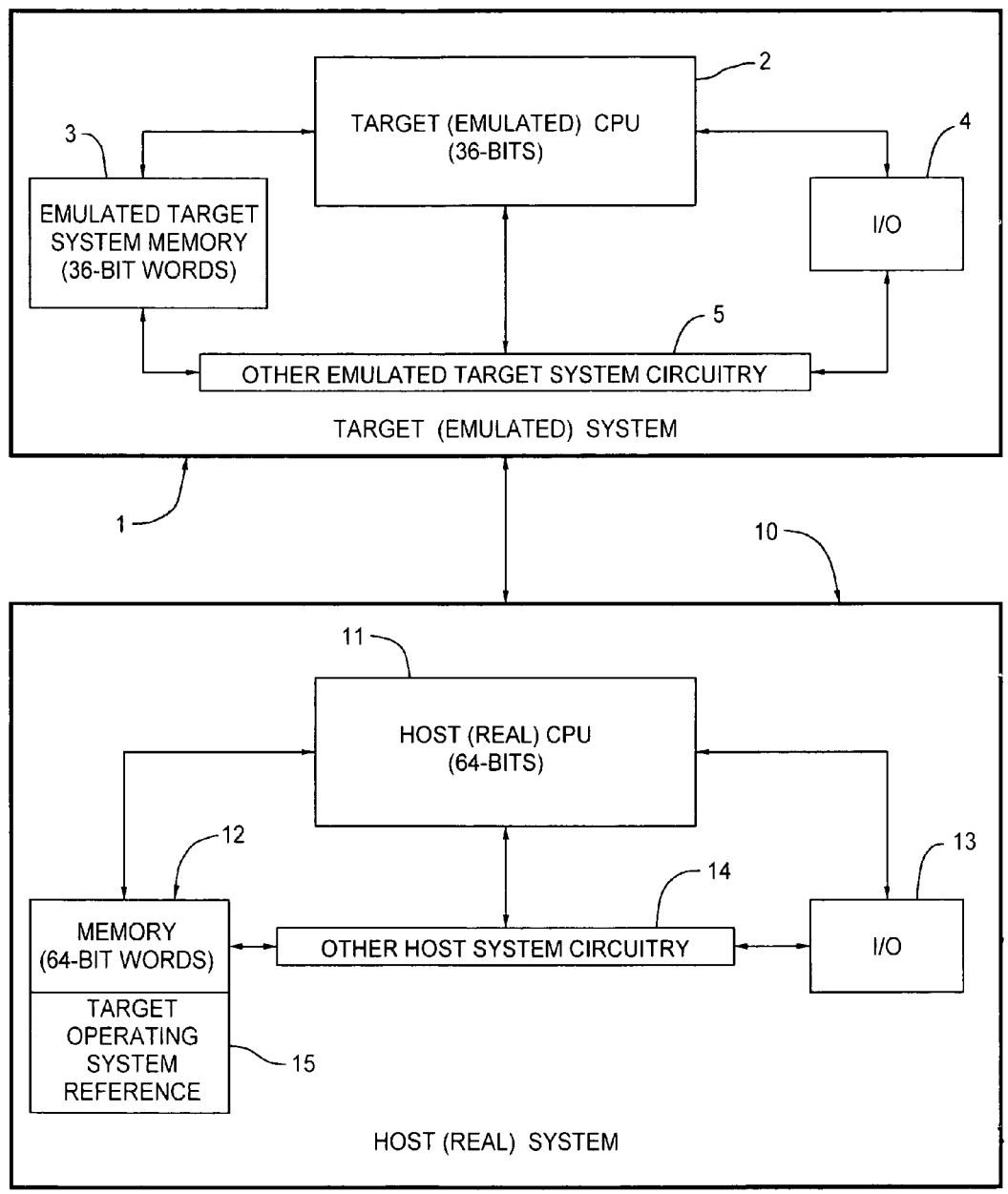
FIG. 1 is a high-level block diagram showing a "host" system emulating the operation of a legacy system, running legacy software.

FIG. 1 illustrates an exemplary environment in which the invention finds application. More particularly, the operation of a target (emulated) "legacy" system is emulated by a host (real) system 10. The target system 1 includes an emulated central processing unit (CPU) 2 (which may employ multiple processors), an emulated memory 3, emulated input/output (I/O) 4 and other emulated system circuitry 5. The host (real) system 10 includes a host CPU 11, a host memory 12, host I/O 13 and other host system circuitry 14. The host memory 12 includes a dedicated target operating system reference space 15 in which the elements and components of the emulated system 1 are represented.

The target operating system reference space 15 also contains suitable information about the interconnection and interoperation among the various target system elements and components and a complete implementation in software of the target system operating system commands which includes information on the steps the host system must take to "execute" each target system instruction in a program originally prepared to run on a physical machine using the target system operating system. It can be loosely considered that, to the extent that the target system 1 can be said to "exist" at all, it is in the target operating system reference space 15 of the host system memory 12. Thus, an emulator program running on the host system 2 can replicate all the operations of a legacy application program written in the target system operating system as if the legacy application program were running on a physical target system.

In a current state-of-the-art example chosen to illustrate the invention, a 64-bit Intel Itanium series processor is used to emulate the Bull DPS 9000 36-bit memory space and the instruction set of the DPS 9000 with its proprietary GCOS 8 operating system. Within the memory space of the emulator, the 36-bit word of the DPS 9000 is stored right justified in the least significant 36 bits of the "host" (Itanium) 64-bit word during the emulation process. The upper 28 bits of the 64-bit word are typically zero; however, sometimes, certain specific bits in the "upper" 28 bits of the "containing" word are used as flags or for other temporary purposes. In any case, the upper 28 bits of the containing word are always viewed by the "emulated" view of the world as being non-existent. That is, only the emulation program itself uses these bits or else they are left as all zeroes. Leaving the bits as all zeroes can also be a signal to the software emulator that it is "emulating" a 36-bit instruction, and the non-zero indication would signal a 64-bit instruction.

Figure 2:
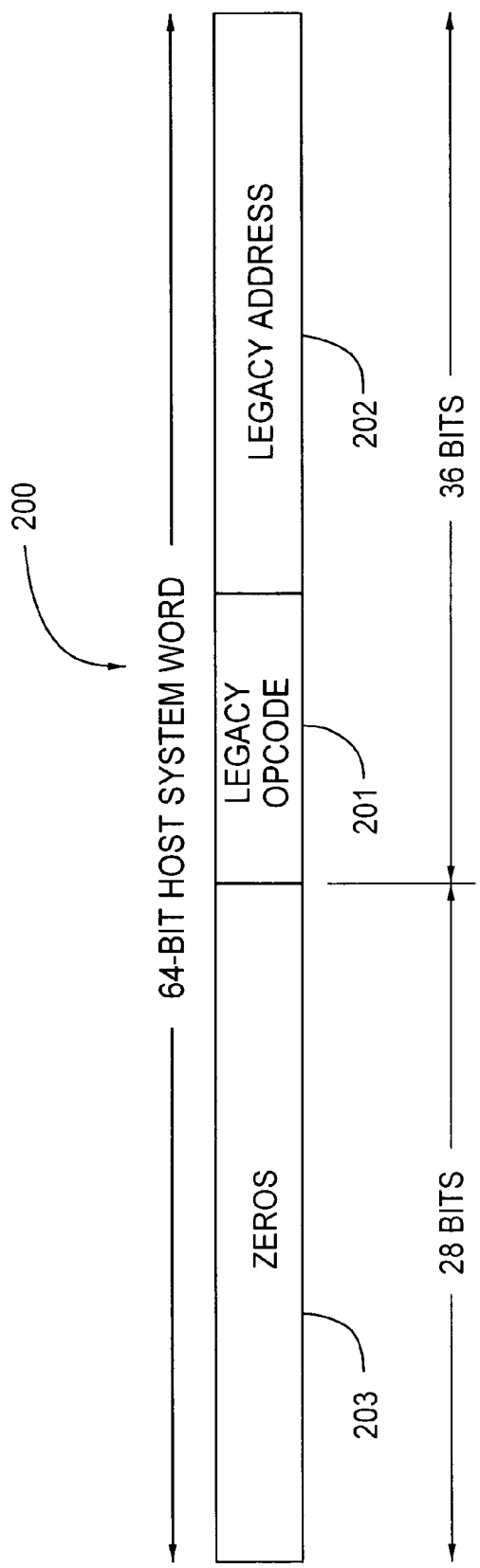
FIG. 2 shows the format of an exemplary simple legacy code instruction that is emulated by emulation software on the host system.

FIG. 2 shows, in a 64-bit host system word 200, the format of a simple 36-bit legacy code instruction word which includes an opcode field 201 and an address or operand field 202 and unused bits which are zeroes 203. Those skilled in the art will appreciate that an instruction word can contain several fields which may vary according to the class of instruction word, but it is the field commonly called the "opcode" which is of particular interest in explaining the present invention. The opcode of the legacy instruction is that which controls the program flow of the legacy program being executed. As a direct consequence the instruction word opcode of each sequential or subsequent legacy instruction controls and determines the overall program flow of the host system emulation program and the program address of the host system code to process each legacy instruction. Thus, the legacy instruction word opcode and the examination and branching of the host system central processor based on the opcode is an important and often limiting factor in determining the overall performance of the emulator. The decision making to transfer program control to the proper host system code for handling each opcode type is unpredictable and dependent on the legacy system program being processed. The order of occurrence and the branching to handle any possible order of instruction opcodes is unpredictable and will often defeat any branch prediction mechanism in the host system central processor which is trying to predict program flow of the emulation program.

Figure 3:
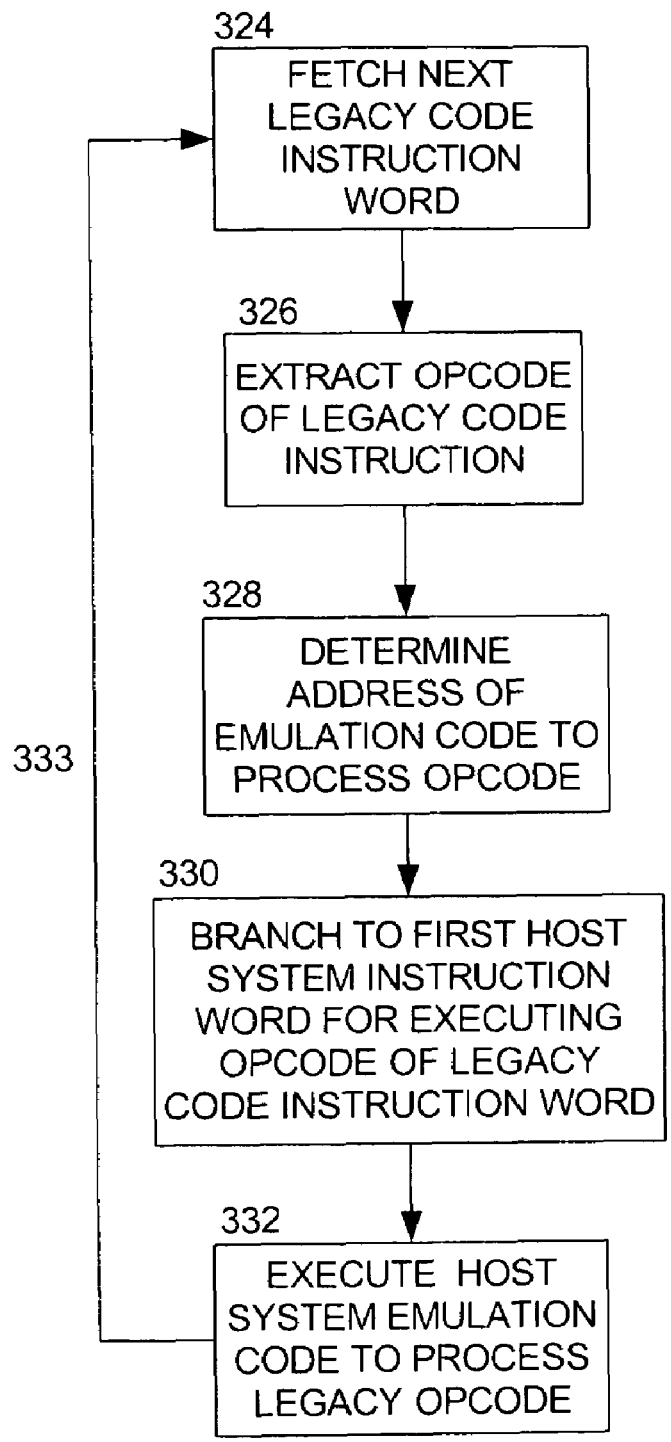
FIG. 3 is a simplified flow chart showing the basic approach to emulating legacy software in a host system.

FIG. 3 is a simplified flow chart showing the basic approach to emulating legacy software in a host system. As a first step 324 an emulated instruction word, the legacy code instruction word, is fetched from host system memory. The emulated instruction word is decoded by the emulation software including the extraction of the opcode 326 from the instruction word. This opcode is used to determine the address of the code within the emulation software 328 which will be selected to process that specific opcode. This determination can be made in many ways well known in the art of computer programming. For example, the address can be looked up in a table indexed by the opcode, with the table containing pointers to the routine that will process that particular instruction. An alternative is to arrange the processing code in host system memory such that the address of each piece of opcode processing code can be calculated, rather than looked up in a table. A second alternative commonly used in the high level "C" programming language is to use a "switch" statement to select between alternate execution paths. A third alternative is to use a table of addresses which point to subroutines or functions, and to use the table to look up the address and the make a call to the proper subroutine based upon that address. This third alternative is particularly efficient when the lower level subroutines for handling a specific opcode are written in either "C" or assembly. Continuing as shown in FIG. 3, once the address of the code to process a specific opcode is selected, a branch to the code selected is made 330 with that branch being either a call instruction if the code is implemented as a subroutine, or a simple branch if the code is in the same routine as the branch itself. Then, the actual code to process the instruction as determined by the opcode is executed 332. Finally, once that instruction is processed the code begins the processing of the next instruction 333.

It is noted at this point that in actual practice the steps shown in FIG. 3 are overlapped and performed in parallel. It is also noted that the fetching of the next instruction, and even several instructions ahead can also be performed in parallel with the processing of any particular opcode or instruction. This prefetch and preprocessing by emulation software code is analogous to that performed in hardware when a machine is implemented in real hardware gates and not the emulation software of the subject invention.

Figure 4:
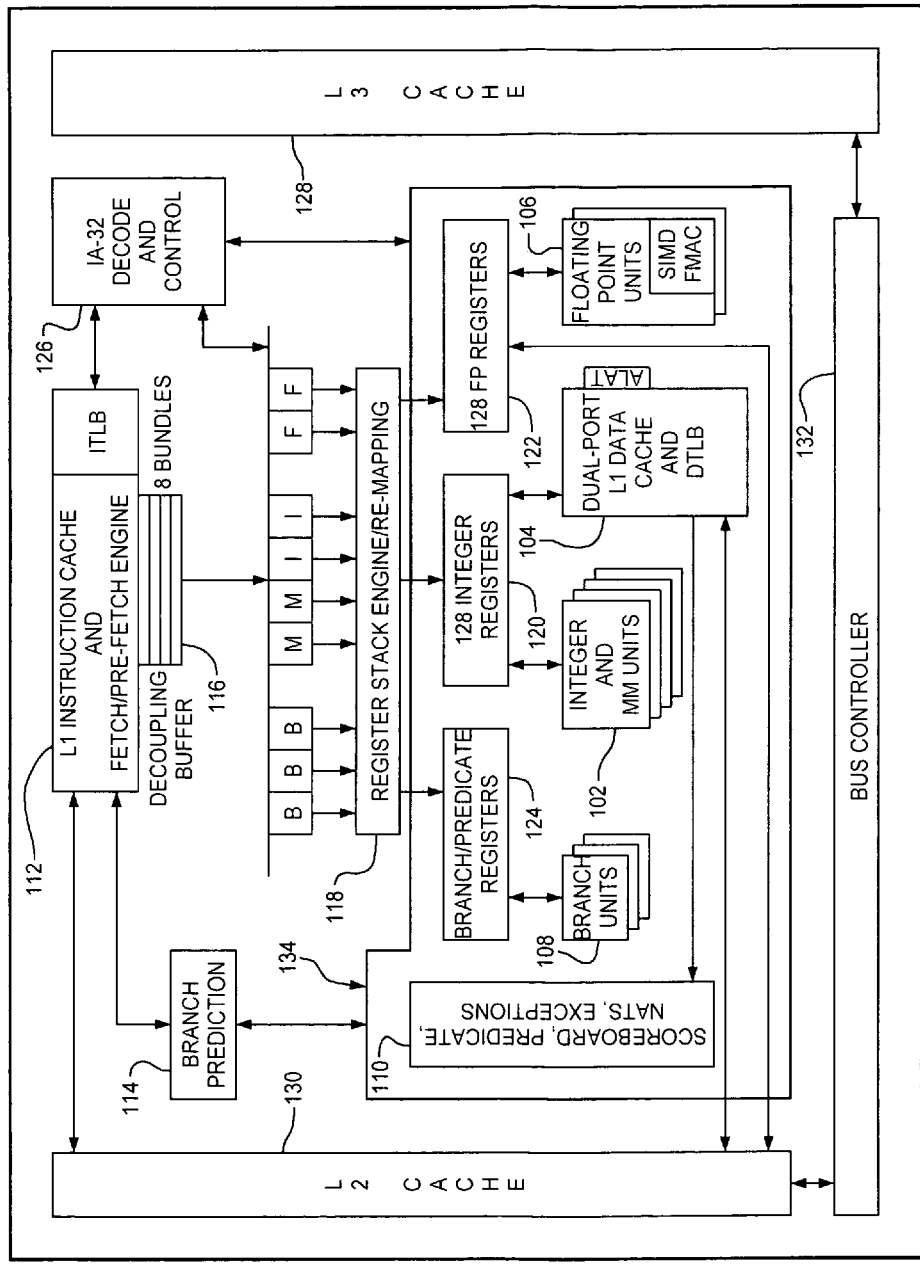
FIG. 4 is block diagram of a host system processor that is well adapted for use in practicing the present invention.

The subject invention can be practiced in host CPUs of any design but is particularly effective in those which include branch prediction registers which assist the hardware in handling branches and also benefits from CPUs employing parallel execution units and having efficient parallel processing capabilities. It has been found, at the state-of-the-art, that the Intel Itanium series of processors is an excellent exemplary choice for practicing the invention. Accordingly, attention is directed to FIG. 4 which is a block diagram of an Intel Itanium processor which will be used to describe the present invention.

The CPU 100 employs Explicitly Parallel Instruction Computing (EPIC) architecture to expose Instruction Level Parallelism (ILP) to the hardware. The CPU 100 provides a six-wide and ten-stage pipeline to efficiently realize ILP.

The function of the CPU is divided into five groups. The immediately following discussion gives a high level description of the operation of each group.

Instruction Processing: The instruction processing group contains the logic for instruction prefetch and fetch 112, branch prediction 114, decoupling coupler 116 and register stack engine/remapping 118.

Execution: The execution group 134 contains the logic for integer, floating point, multimedia, branch execution and the integer and floating point register files. More particularly, the hardware resources include four integer units/four multimedia units 102, two load/store units 104, two extended precision floating point units and two single precision floating point units 106 and three branch units 108 as well as integer registers 120, FP registers 122 and branch and Predicate registers 124. In certain versions of the Itanium 2 architecture, six of the execution units can be utilized by the CPU simultaneously with the possibility of six instructions being started in one clock cycle, and sent down the execution pipeline. Six instructions can also be completed simultaneously.

Control: The control group 110 includes the exception handler and pipeline control. The processor pipeline is organized into a ten stage core pipeline that can execute up to six instructions in parallel each clock period.

IA-32 Execution: The IA-32 instruction group 126 group contains hardware for handling certain IA-32 instructions; i.e., 32-bit word instructions which are employed in the Intel Pentium series processors and their predecessors, sometimes in 16-bit words.

Three levels of integrated cache memory minimize overall memory latency. This includes an L3 cache 128 coupled to an L2 cache 130 under directive from a bus controller 130. Acting in conjunction with sophisticated branch prediction and correction hardware, the CPU speculatively fetches instructions from the L1 instruction cache in block 112. Software-initiated prefetch probes for future misses in the instruction cache and then prefetches specified code from the L2 cache into the L1 cache. Bus controller 132 directs the information transfers among the memory components.

The foregoing will provide understanding by one skilled in the art of the environment, provided by the Intel Itanium series CPU, in which the present invention may be practiced. The architecture and operation of the Intel Itanium CPU processors is described in much greater detail in the Intel publication "Intel® Itanium™ 2 Processor Hardware Developer's Manual" which may be freely downloaded from the Intel website and which is incorporated by reference herein.

The Itanium 2 is presently preferred as the environment for practicing the present invention, but, of course, future versions of the Itanium series processors, or other processors which have the requisite features, may later be found to be still more preferred.

Figure 5:
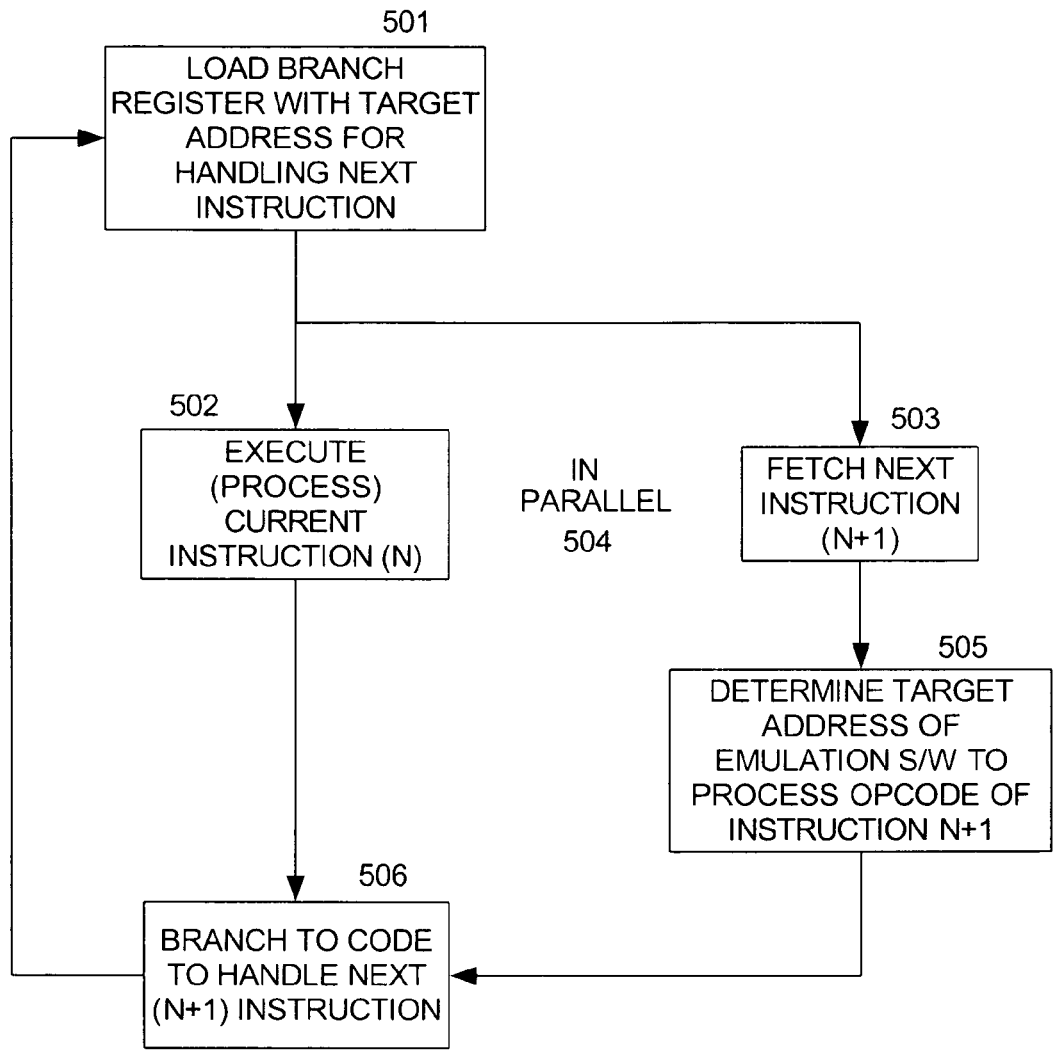
FIG. 5 is a block diagram illustrating the use of a branch register in the Intel Itanium 2 processor to achieve efficient branching to begin processing of the next emulated instruction while executing a first instruction.

FIG. 5 is a block diagram illustrating the use of a branch register in the Intel Itanium 2 processor to achieve efficient branching to begin processing of the next emulated instruction while executing a first instruction. Reference may be taken to co-ending U.S. application Ser. No. 11/174,866 entitled "Lookahead Instruction Fetch Process for Improved Emulated Instruction Performance" by Russell W. Guenthner et al, filed Jun. 6, 2005, and assigned to the same Assignee as the present application for a more complete exposition of the advantages of selecting a host processor having the characteristics of the Intel Itanium series processors for emulating legacy software. The same reference also illustrates the advantage in using an Itanium branch register and a pipelined approach to instruction decode and execution which provides for efficient switching from one instruction to another in the emulated instruction stream.

In FIG. 5 each instruction's processing begins with loading the branch register with the target address of the machine code to process the next instruction 501. During the required delay time between loading and using a branch register other work can be. For this example two pieces of work are done 502, 503 and 504. The "current" or first instruction is processed 502, and in parallel the next instruction is fetched 503 and its opcode is decoded in order to determine the target address of the machine code 505 to process that next instruction. Once both tasks are complete, the branch to the machine code for handling the next instruction is invoked 506.

FIG. 6 is a diagram illustrating multiple versions 601, 602 and multiple revisions 603 of the compiled C or assembly emulation processing unit which are dependent upon possible emulation software option selection 600. The emulation software is the program that "emulates" the instruction set of the legacy processor. The emulation software exists in several forms. At the highest level the software exists as a version written in the "C" language, or any other high level language. Since emulation software may often be emulating a high performance mainframe computer the performance of the emulation software will often be of critical performance, and therefore a highly optimized version of the emulation software will be developed at the lowest level of programming called machine or assembly language. During development of the emulation software it is likely that the "C" version will be more reliable and may provide better diagnostics than the assembly version.

The assembly version may provide much more performance, that is, it may run much faster, but be much less easily debugged. Therefore one primary selection 601 that may be made by the user is to select between the "C" and the assembly version of the emulation software. A second level of selection 602 could specify whether the emulation software provides any trace of the emulated instruction flow, whether for debugging the user's program, or for debugging the emulation software itself. As development proceeds and performance or feature enhancements are made to the emulation software there will exist multiple revisions 603 of the emulation software. This 603 is a third option that may also be selected by the user. These exemplary options and revisions from which the user may select illustrate the variety of control that may be needed in providing multiple versions of emulation software. The number of versions makes it expensive and maybe even prohibitive to provide a different machine for testing or use of all the desired versions of the software. It is because of this need and the difficulty in providing for it that the subject invention was conceived. Referring again to FIG. 6 the exemplary options as described above are marked as 601, 602 and 603. For ease of understanding the exemplary versions as shown in FIG. 6 are named with three characters corresponding to the three options 601, 602 and 603. The first character of the version is named starting with a "C" or an "A" depending if the 601 option selects "C" or assembly as the source. The second character of the version is either a "D" or an "N" denoting whether a "debug" version or a version without debug trace output 602 is desired. The third character is the revision number as specified by option 603. Three examples of names are marked as 630, 631, and 632 with the explanation for meaning as shown in the figure. It can be seen that as the number of options increases the possibilities expand quickly.

Figure 7:
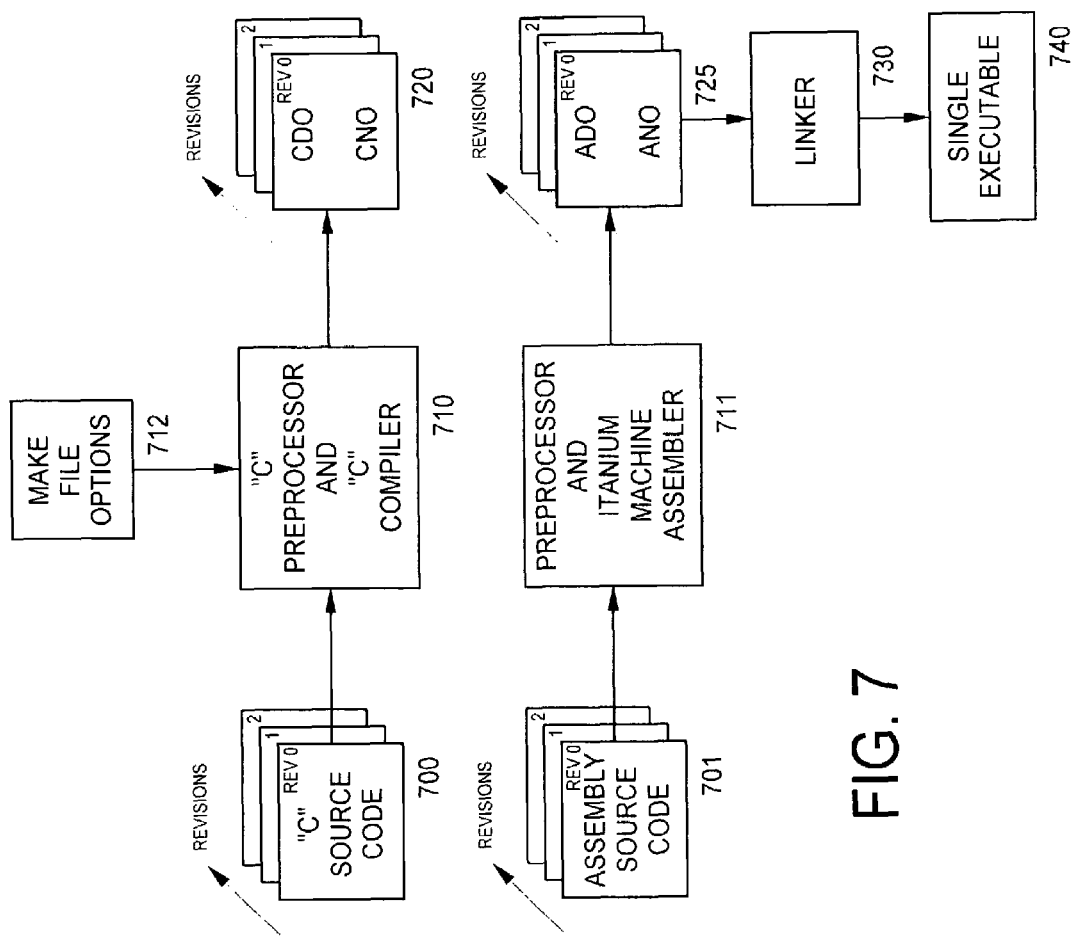
FIG. 7 is a diagram illustrating multiple versions of the compiled emulation software produced by using C preprocessor constructs to control multiple compilations based upon a single input program source file.

FIG. 7 is a diagram illustrating the flow of processing for producing multiple emulation modules using a "C" (or "C++") compiler and also a machine language assembler. A preprocessor such as the C preprocessor commonly called "CPP" is used to control multiple compilations based upon a single input program source file. The compiler and assembler must process the source code with options applied in all the combinations that will be required by the users of the system. These versions are processed and collected into multiple machine code modules. It is noted that the entry points for each module must have a different name in order that when the modules are linked together for execution that a different entry point is made available, with its own pointer, for each module.

In FIG. 7 the C source files 700 are shown with multiple revisions of the source. The assembly source code files 701 are also shown with multiple revisions available. Each revision of the C 700 source code files must be run through the C preprocessor and compiler 710. Each revision of the assembler 701 source code files must be run through an optional preprocessor and assembler 711. In the diagram the exemplary assembler 711 is the Intel Itanium 2 assembler. The control of options and the management of multiple builds and compiles is typically done by a program well known in the industry called "make" marked as 712 in the figure. The "make" program feeds all the files and options and commands to the compiler and assembler and they do their work. In this manner multiple emulator modules 720, 725 are produced and saved in files and then linked 730 together to form a single executable 740. It is important to note that this single executable contains the machine code for all the versions and revisions of the modules, not just any specific set.

Since the actual selection of options is being done at run time or "job" time all of the possible modules that might be selected must be contained within a single executable. There would not be time for loading or reading specific modules from a file, because in a multiprocessor system with multiple users and slices of processor time being handed out to many programs, the switching must be nearly instantaneous so as not to have any significant impact on overall performance of a job. The mechanism of switching pointers which is one subject of this invention enables this fast switching on a time-slice by time-slice basis.

Figure 8:
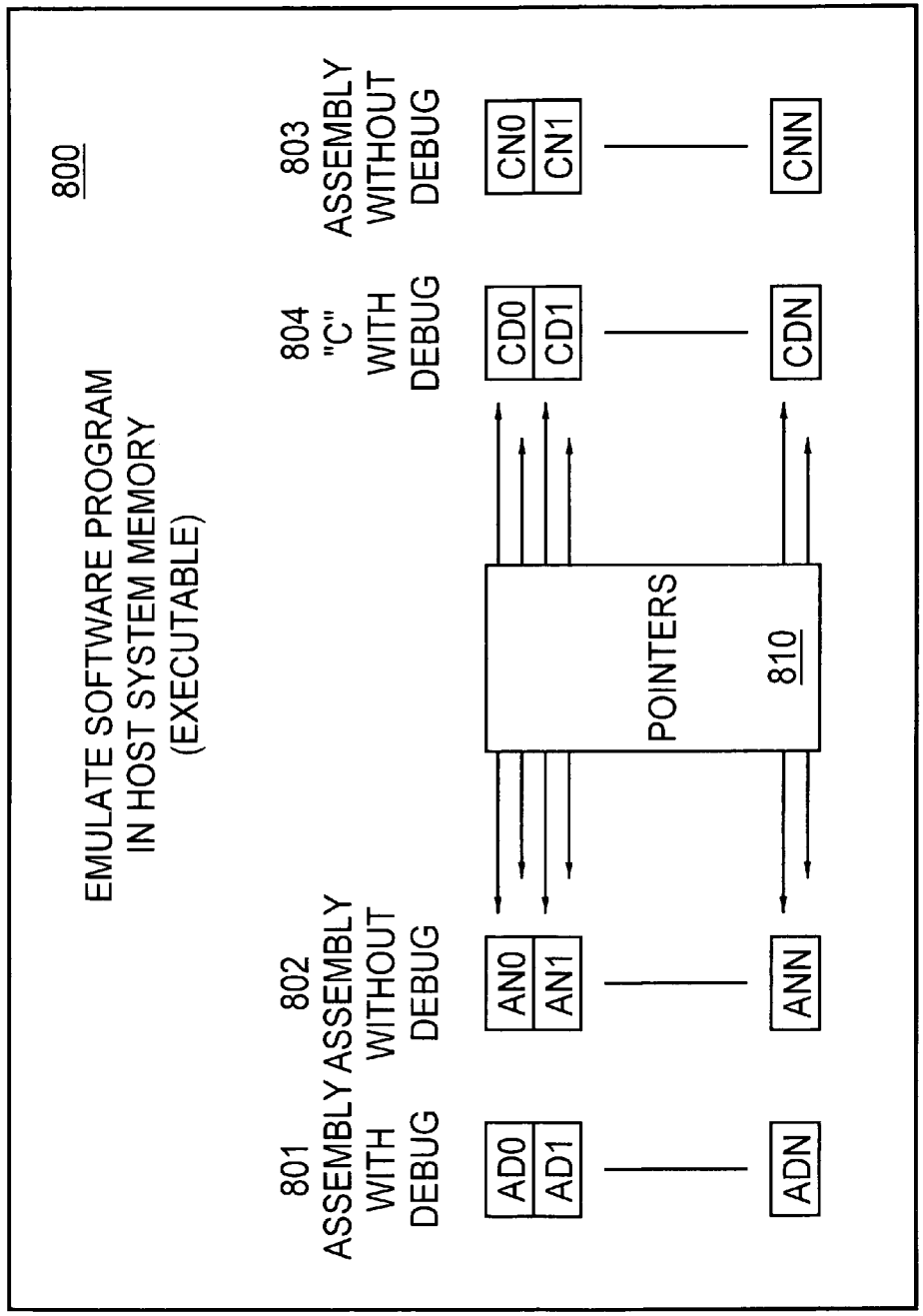
FIG. 8 is a diagram illustrating several revisions and/or versions of emulation software modules compiled with selected control parameters which have been linked into a single executable, with the specific module to be selected and subsequently controlled at run-time based upon the user's selection of job control parameters.

FIG. 8 is a diagram illustrating several revisions and/or versions of emulation software modules 801, 802, 803, 804 as compiled with selected control parameters which have been linked into a single executable 800. Within the executable a table of pointers 810 is also constructed which point to the beginning or starting instruction for each module. This table of pointers is the central control point utilized by the software to switch from one module to the other depending upon the user's choice of options or revisions. The table of pointers is used by the emulation software to control program flow and direct the processing to the proper module without requiring time or the need for examining options throughout the program. The pointers that control program flow are switched only as necessary between each user's slice of time for the CPU and no other examination of options is necessary once the job is started, except for the switching of the pointers each time a new time-slice is started. This is much more performant than repeatedly examining options with checks and branches throughout the program.

Figure 9:
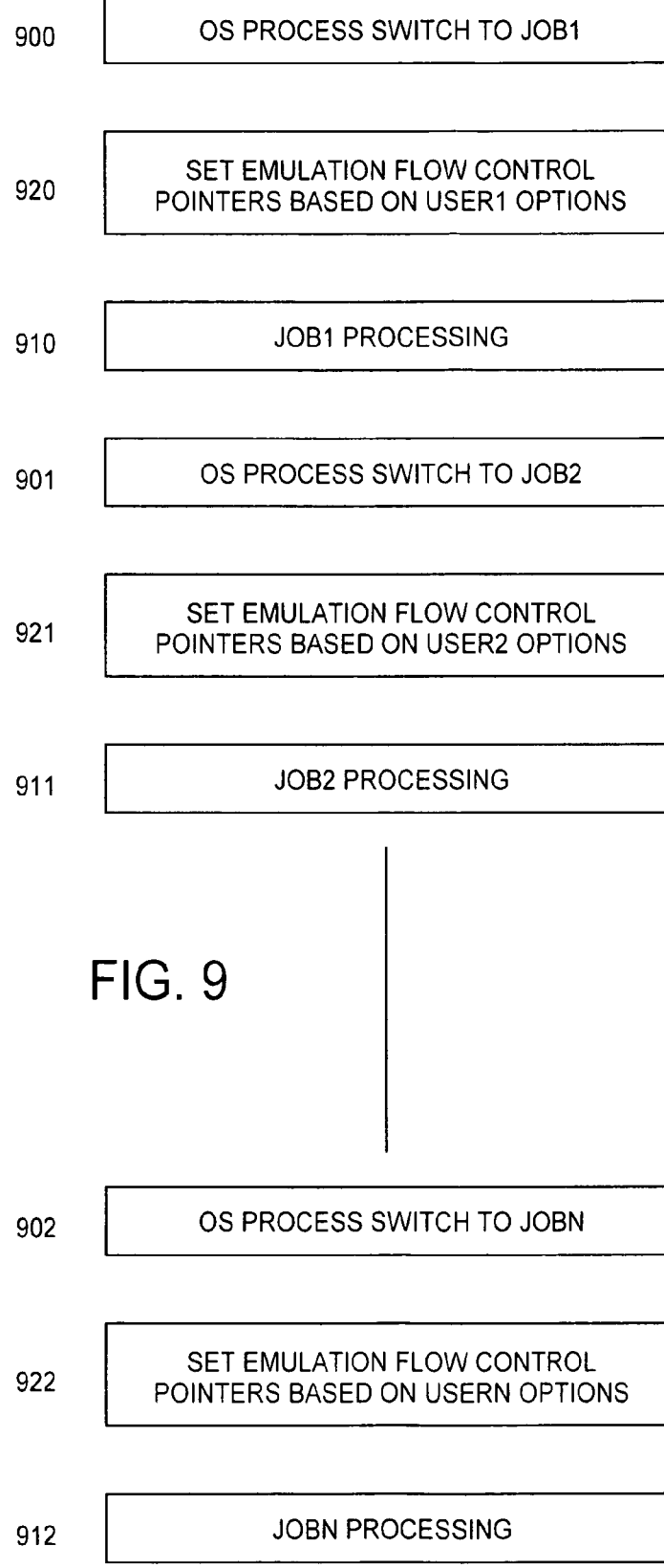
FIG. 9 is a diagram illustrating the changing of the emulation program flow control pointers as necessary between jobs or slices of processing time such as to provide different options for different users, processes or threads.

FIG. 9 is a diagram illustrating the changing of the emulation program flow control pointers as necessary between jobs or slices of processing time such as to provide different options for different users, processes or threads. The work by the operating system (OS) for switching from one job to another 900, 901, 902 is as typical in the state of the art. The work for processing the user's job 910, 911, 912 is also as typical in a multiprogram computer system. The work necessary to select a specific version of the software which is doing hardware emulation is marked as 920, 921 and 922. The amount of work for switching from one job to another is typically small compared to the work done on behalf of the user, that is, the processing switch time is small compared to the time spent in processing. The added work which is part of the subject invention for selecting and changing the emulation flow control pointers is very small in comparison to the time typically utilized performing work on behalf of the user.

Performant emulation of a legacy central processor with an emulation software program requires extremely careful crafting and attention to detail in the implementation. Any unnecessary checking of conditions not absolutely required for the emulation of the instruction itself must be avoided in order to maximize the performance. For example, using the Intel Itanium 2 chip and machine assembly programming it is possible to achieve emulation of an instruction set where some instructions are completed at a burst rate of one instruction every nine CPU clock cycles. To achieve performance at this level only one unpredicted branch instruction can be processed per emulated instruction, and therefore any exception processing within each instruction must not be a part of each instruction's regular coding. Instead, a method which is the subject of this invention is to package multiple versions of the emulation code in which the options are selected at a higher level, but not at too high of a level. The options cannot be selected only at job start time because an emulated CPU actually processes many jobs at a time with each job typically requiring many time slices of the CPU's time and the options required for different jobs may be different. The options cannot be selected during each instruction's processing because that requires too much overhead and would slow down the emulation speed.

The solution of the subject invention is to apply the selection of options at the beginning of each CPU time slice, and to invoke a specific module of emulation software code at that time. The specific module and the pointers to that module are contained within a single execution unit which contains all possible modules that might be selected based upon the desired user options.

This same need for performance and the approach to handling options to achieve flexibility while not lowering performance can be applied to other software programs, in particular those which perform functions similar to that of a hardware emulator. Logic simulators utilizing the well known Verilog or VHDL languages to describe the interconnection of logic devices would be driven in the same manner to achieve high performance while providing options for display or tracing. Transaction processing or any other computer processing in which a small critical highly optimized loop of machine instructions is needed to achieve performance could benefit from the same approach.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An Apparatus for emulating in software on a host system, operations of a target computer system including:
   A) a central processing unit which is a first part of the host system;
   B) a host system main memory which is a part of a second part of the host system;
   C) target system memory contained within said host system main memory;
   D) an emulation program stored within the host system main memory, the emulation program comprising host system machine instructions for processing by the host system central processing unit, the emulation program including a plurality of software modules, and the plurality of software modules including a set of selectable alternative software modules, being simultaneously resident in the host system main memory;
   E) an option control for selection of a plurality of options by a user which have influence upon the operation of the emulation program; and,
   F) said selection made by the option control in response to a selection of a user chosen specific software module, the selection controlling branching by the emulation program and resulting in the emulation program utilizing the user chosen specific software module during the emulating of the operations of the target computer system.

2. The apparatus of claim 1 wherein the selection of the user chosen specific software module from the plurality of software modules occurs at start of a specific user job resulting in the emulation program utilizing the user chosen specific software module during the emulating for that specific user's job.

3. The apparatus of claim 2 in which said selection of user chosen specific software module from the plurality of software modules occurs at start of the specific user's time slice of processing in a multiprogramming environment.

4. The apparatus of claim 3 in which said selection of the user chosen specific software module is achieved by modifying software program pointers so as to utilize the user chosen specific software module.

5. The apparatus of claim 4 in which said software program pointers referencing the plurality of software modules are stored in at least one table with selection from the table based upon user chosen options.

6. The apparatus of claim 2 in which said selection of the user chosen specific software module is achieved by modifying software program pointers so as to utilize the user chosen specific software module.

7. The apparatus of claim 6 in which software program pointers referencing the plurality of software modules are stored in at least one table with selection from the table based upon user chosen options.

8. The apparatus of claim 1 in which said selection of the user chosen specific software module is achieved by modifying software program pointers so as to utilize the user chosen specific software module.

9. The apparatus of claim 8 in which software program pointers referencing the plurality of software modules are stored in at least one table with selection from the table based upon user options.

10. The apparatus of claim 1 wherein the selection of the user chosen specific software module from the plurality of modules is repeated at the start of each user processing time slice and includes facilities for multiple users, wherein each individual user is able to make an individualized selection of the plurality of options.

11. A method for packaging and controlling a selection of options to control a software program used in emulating operation of a target computer system, the software program running on a host system which includes a host system main memory, the method including:
   A) packaging a plurality of selectable software modules as a part of the software program;
   B) storing the software program including the plurality of selectable software modules in host system memory, at least two of the plurality of selectable software modules being simultaneously resident in the host system memory;
   C) providing an option control facility enabling a plurality of options selected by a user to have influence upon the operation of the software program in carrying out the emulating operation;
   D) applying signals from said option control facility for selection of a user desired specific selected software module from the plurality of selectable software modules;
   E) achieving a user chosen software program flow which utilizes the user desired specific selected software module by storing software pointers to control branching within the software program with the pointers being dependent upon the user's selection of options, and,
   said software pointers pointing to target locations in memory which are within the plurality of software modules.

12. The method of claim 11 wherein the method further includes the step of: during a time just prior to when a specific user job is started, changing said software program flow based upon user control requirements of the specific user job.

13. The method of claim 12 wherein the method further includes the step of: during a time just prior to when a specific user job is given a time-slice for processing, changing said software program flow based upon user control requirements of the specific user job.

* * * * *